US010367857B2

(12) United States Patent
Ali et al.

(10) Patent No.: US 10,367,857 B2
(45) Date of Patent: Jul. 30, 2019

(54) MANAGING CONFERENCE-CALLS

(71) Applicant: International Business Machines Corporation, Armonk, NY (US)

(72) Inventors: Diaa Eldin Ali Mohamed Mahmoud Ali, Doha (AU); Teodora Sandra Buda, Mulhuddart (IE); Hitham Ahmed Assem Aly Salama, Mulhuddart (IE); Patrick Joseph O'Sullivan, Mulhuddart (IE); Lei Xu, Mulhuddart (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 30 days.

(21) Appl. No.: 15/474,151

(22) Filed: Mar. 30, 2017

(65) Prior Publication Data

US 2018/0288108 A1    Oct. 4, 2018

(51) Int. Cl.
| | | |
|---|---|---|
| *H04L 12/26* | (2006.01) | |
| *H04L 29/06* | (2006.01) | |
| *H04L 12/24* | (2006.01) | |
| *H04M 3/56* | (2006.01) | |
| *H04M 7/12* | (2006.01) | |
| *H04M 7/00* | (2006.01) | |
| *H04M 3/22* | (2006.01) | |

(52) U.S. Cl.
CPC ...... *H04L 65/1083* (2013.01); *H04L 41/5067* (2013.01); *H04L 65/403* (2013.01); *H04L 65/80* (2013.01); *H04M 3/567* (2013.01); *H04M 7/1275* (2013.01); *H04L 43/08* (2013.01); *H04M 3/2227* (2013.01); *H04M 7/006* (2013.01); *H04M 7/0072* (2013.01)

(58) Field of Classification Search
CPC ...................................................... H04L 41/42
See application file for complete search history.

(56) References Cited

U.S. PATENT DOCUMENTS

| 6,529,499 B1 * | 3/2003 | Doshi | ................. H04L 12/4641 370/230 |
|---|---|---|---|
| 6,731,734 B1 * | 5/2004 | Shaffer | .................... H04M 3/56 379/202.01 |

(Continued)

OTHER PUBLICATIONS

Mel, et al. "The NIST Definition of Cloud Computing". Recommendations of the National Institute of Standards and Technology. Nov. 16, 2015.

(Continued)

*Primary Examiner* — Guang W Li

(74) *Attorney, Agent, or Firm* — David Zwick, Esq.; McGinn IP Law Group, PLLC

(57) ABSTRACT

A conference call management method, system, and computer program product include inferring an Internet Protocol (IP) address of a new user requesting to join a call including at least one other user, inferring a codec to stream an emulated network pattern for the call if the new user were to join the call, measuring a call quality perceived by the at least one other user in the call while the emulated codec is run on the call, and measuring an impact on the call quality in a case that the new user joins the call based on the perceived call quality and the network pattern.

18 Claims, 5 Drawing Sheets

(56) References Cited

U.S. PATENT DOCUMENTS

| | | | | |
|---|---|---|---|---|
| 7,002,992 | B1* | 2/2006 | Shaffer | H04M 7/0072 370/252 |
| 7,085,243 | B2* | 8/2006 | Decker | H04L 12/1818 348/E7.084 |
| 7,627,629 | B1* | 12/2009 | Wu | H04L 12/1818 348/14.09 |
| 7,742,499 | B1* | 6/2010 | Erskine | H04L 41/5032 370/352 |
| 8,433,050 | B1* | 4/2013 | Baten | H04L 65/80 375/219 |
| 8,456,532 | B1* | 6/2013 | Petkevich | H04N 5/23206 348/207.1 |
| 8,881,029 | B2* | 11/2014 | Thapa | H04N 7/15 715/756 |
| 8,995,306 | B2* | 3/2015 | Puri | H04L 1/0041 370/260 |
| 9,232,049 | B2 | 1/2016 | Assem et al. | |
| 9,356,987 | B2* | 5/2016 | Coulombe | H04L 65/607 |
| 2003/0086370 | A1* | 5/2003 | Woo | H04L 29/06027 370/230 |
| 2005/0052996 | A1* | 3/2005 | Houck | H04L 29/06027 370/230 |
| 2005/0265312 | A1* | 12/2005 | Thermond | H04L 29/06027 370/352 |
| 2008/0205267 | A1* | 8/2008 | El Barachi | H04L 65/1069 370/230 |
| 2009/0245497 | A1* | 10/2009 | Ruetschi | H04L 12/1818 379/202.01 |
| 2009/0316870 | A1 | 12/2009 | Wise et al. | |
| 2011/0150199 | A1* | 6/2011 | Gisby | H04M 3/563 379/202.01 |
| 2013/0198629 | A1* | 8/2013 | Tandon | H04M 3/567 715/716 |
| 2015/0078332 | A1* | 3/2015 | Sidhu | H04W 36/0066 370/331 |
| 2015/0117232 | A1* | 4/2015 | Dunne | H04L 65/80 370/252 |
| 2016/0247517 | A1* | 8/2016 | Assem Aly Salama | G10L 19/0018 |
| 2017/0093992 | A1* | 3/2017 | Fahlgren | H04L 67/18 |
| 2018/0176510 | A1* | 6/2018 | Pepperell | H04N 7/152 |

OTHER PUBLICATIONS

Authors et. al.: Disclosed Anonymously "A Method and System for Providing VOIP Call Quality Information for an Individual Line in Real Time". An IP.com Prior Art Database Technical Disclosure, IP.com No. IPCOM000233130D, Nov. 25, 2013.

Authors et. al.: Disclosed Anonymously "Method and System for Initiating a Conference Call durin Non-Availability of a Moderator of the Conference Call". An IP.com Prior Art Database Technical Disclosure, IP.com No. IPCOM000202108D. Dec. 3, 2010.

Authors et. al.: Disclosed Anonymously "Competitive disclosure—System and Method to Motivate QoS in Unified Telephony Applications". An IP.com Prior Art Database Technical Disclosure, IP.com No. IPCOM000209866D. Aug. 18, 2011.

* cited by examiner

MANAGING CONFERENCE-CALLS

BACKGROUND

The present invention relates generally to a conference call management method for application software, and more particularly, but not by way of limitation, to a system, method, and computer program product for sustaining the call quality through management of the call participants.

Voice-over-IP (VoIP) performance depends on a number of network-related factors, including available bandwidth, end to-end delay, packet loss and jitter. Variance in these parameters often leads to degradation of VoIP performance and the Quality-of-Experience (QoE) perceived by end users. Moreover, other than network issues, applications-specific factors like the choice of codec, codec parameters, and jitter buffer sizing also impacts QoE. It is important for implementers of VoIP applications to assess QoE as perceived by the end user and take mitigating actions when it degrades to unacceptable levels. Mean Opinion Score (MOS) is a commonly-accepted metric to measure the QoE of a call as perceived directly by the end user. It encapsulates the effects of both network-specific and implementation-specific issues.

When the number of the conference call participants is small (e.g., a few people), usually the call quality would be excellent or the best that could be achieved based on the current system and network capabilities. However, when the number of participants starts to grow (e.g., in case of educational sessions, all-hands meetings, remote round-table meetings, etc.), the system and network resources would be overloaded such that it is not feasible to maintain the same call quality, and accordingly, Quality of Service (QoS) would be dropped which could cause call troubles and eventually user dissatisfaction.

There is a need in the art for a technique that can help the moderator in avoiding the drop of the call quality due to the situation of too many participants joining the call, using too many resources, such that the load would be exceeding the capability of the network bandwidth and resources available.

SUMMARY

In an exemplary embodiment, the present invention can provide a computer-implemented conference call management method, the method including inferring an Internet Protocol (IP) address of a new user requesting to join a call including at least one other user, inferring a codec to stream an emulated network pattern for the call if the new user were to join the call, measuring a call quality perceived by the at least one other user in the call while the emulated codec is run on the call, and measuring an impact on the call quality in a case that the new user joins the call based on the perceived call quality and the network pattern. One or more other exemplary embodiments include a computer program product and a system, based on the method described above.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways that should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
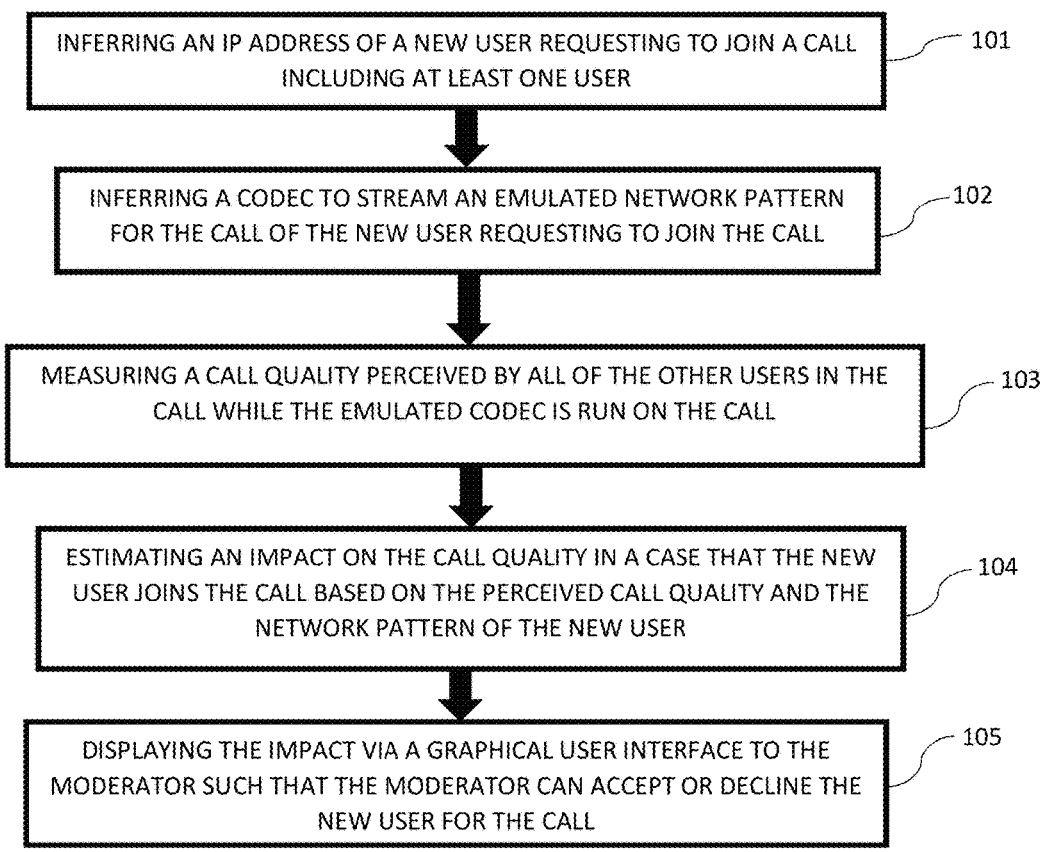
FIG. 1 exemplarily shows a high-level flow chart for a conference call management method 100 according to an embodiment of the present invention.

The invention will now be described with reference to FIGS. 1-5, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of a conference call management method 100 according to the present invention can include various steps for managing a multi-user conference call to dynamically recommend the maximum number of call participants to a call moderator to maintain a certain (e.g., predetermined) call quality.

Figure 3:
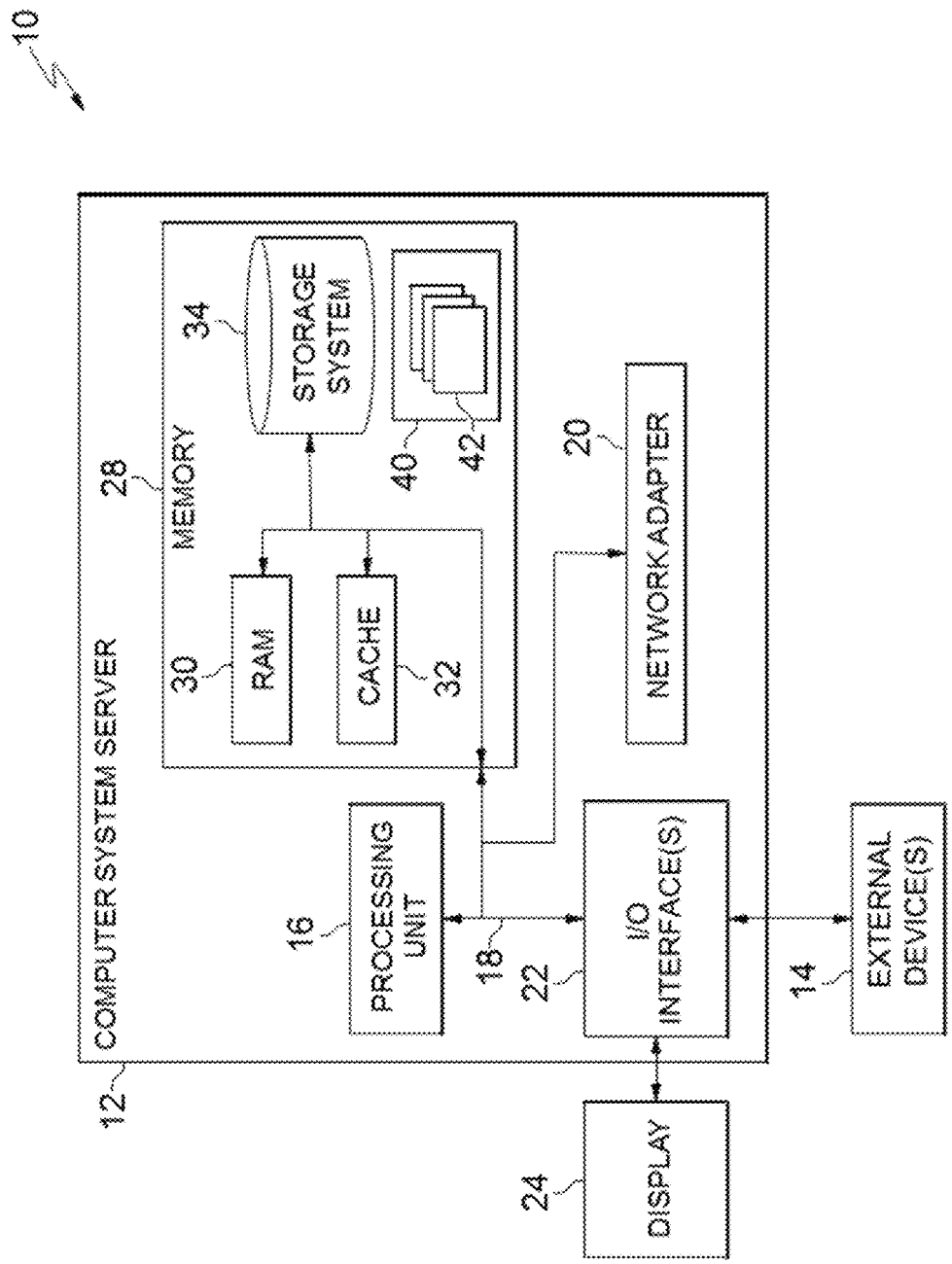
FIG. 3 depicts a cloud-computing node 10 according to an embodiment of the present invention.

By way of introduction of the example depicted in FIG. 3, one or more computers of a computer system 12 according to an embodiment of the present invention can include a memory 28 having instructions stored in a storage system to perform the steps of FIG. 1.

With reference generally to the embodiments of the invention, the embodiments herein describe a platform-managed QoS model-driven framework (i.e., controller) for guaranteeing QoS on a platform-wide basis. Associated with this platform-managed QoS model-driven framework is a per-call QoS/QoE model-driven framework (i.e., Agent).

Associated with the Controller is a set of parameters that include inbound and outbound capacity, characteristics of platform bandwidth (availability, in use, riot in use), QoS/QoE metrics derived from each of the multi-party calls that are in play (derived from per-call QoS/QoE model driven framework), PMI and health from the associate servers running the service. The parameters can he determined by running a so called "dummy user" in which the user is added to the call to determine the parameters of the system with the addition of the user while not actually adding stress to the system (i.e., not packets actually sent by the dummy user). This platform model captures the capabilities, health and running QoS/QoE metrics from the platform and multi-party calls taking place on the platform.

Associated with Agent is an understanding as to who is in each call, what bandwidth each user is using, codecs in place, details such as packet loss/jitter/latency, CPU and Memory requirements for the multi-party session, real-time metrics around voice quality using MOS scoring to derive same, etc. In other words, a metric is displayed or sent to the agent of the current call stress and the stress of each user on the call.

Further, consideration is taken for some situations that can arise (e.g., in saturation) where one session can include a plurality of other sessions and multi-party calls. As an example, a system that is working optimally and is at maximum capacity can be significantly compromised with even one additional call comprising of (e.g., 500) participants being added, where exceeding saturation creates problems (QoS/QoE, stability, performance) for other parallel sessions in play.

To guarantee QoS at a platform level for the plurality of multi-party calls in play, both the Controller and Agent work in close tandem and in real time. The invention can dynamically manage the maximum number of call participants to maintain/guarantee call quality QoS/QoE This is achieved via running a dynamic assessment for the current bandwidth during calls in play where the Controller is paying close attention to real-time data from the Agent, in turn allowing the system balance the maximum possible number of participants that could be served within the available bandwidth without encountering degradation of the conference call quality for the plurality of sessions in play. The Controller, leveraging data from the Agents, can inform (in real-time) moderators and users with the expected QoS in case more participants joined the conference call at run time. The Agent can also manage to a platform QOS/QOE percentile. Indeed, the Agent can dynamically manage the right to accept or decline the joining request of any more participants over a certain limit recommended that could stress the available system resources and cause a degradation in the call quality.

The invention can provide a server managed QoS/QoE, leveraging an agent controller architecture. In a preferred embodiment, each agent keeps the controller up to date on session specifics for each call (e.g., number of attendees, bandwidth used, QoS/QoE experienced, latency/packet loss/Jitter, CPU and Memory used during the call, other services used in the call (e.g. embedded chat, whiteboarding, etc.)). The Controller then aggregates a platform understanding/picture leveraging data from the plurality of agents). In turn, the controller can provide instructions to all agents on who can add more sessions/attendees, as well as control (in real-time) capabilities in the plurality of meetings taking place. As an example, if the controller observes that the meeting server is at or near capacity then the controller can instruct agents not to allow any more attendees to be added, the controller can instruct some/all sessions to disable chat or white-boarding, etc. The agent also can be provided with a Graphical User Interface (GUI) which displays the current stress of each user and the additional stress of an additional user on the system if the additional user was added.

Indeed, in the interests of protecting platform QoS/QoE the controller can, in critical saturation situations, send an instruction to an agent to immediately terminate the agent's session leveraging some kind of priority based systems (e.g. First in Last Out (FILO), or free users of the platform may potentially suffer compromised capabilities so that QOS/QOE is protected for paying users, etc.). Likewise, the controller can dynamically adjust bandwidth and other per-session characteristics for one or a plurality of sessions to protect and manage platform level QOS/QOE (i.e., everyone suffers a little bit so that platform QoS/QoE can be protected for all tenants).

Thus, the multi-user conference calls can be monitored to dynamically recommend the maximum number of call participants to maintain a certain call quality. This can be achieved via running a dynamic assessment for the current bandwidth during the call to inform the host (Moderator) with the maximum possible number of participants that could be served within the available bandwidth without encountering degradation of the conference call quality. The system can also inform the host (Moderator) with the expected QoS in case more participants joined the conference call on run time. The system would also give the host (moderator) the right to accept (or decline) the joining request of any more participants over a certain limit recommended by the system that can stress the available system resources, thereby causing a degradation in the call quality The embodiments described herein can provide the information regarding quality assessment of the conference call in terms of number of joined participants or the capability to accept (or decline) new participants that could affect call quality to the agent. The user can either set the maximum number of users prior to the call, or all users join in unlimited number. The herein introduced feature gives the moderator more flexibility in terms resolving the priority of accepting new participants with trading off the quality or maintaining call quality with trading off the extra number of participants.

In other words, the moderator can dynamically decide to add/drop a user from the call based on the stress to the system that the user has and the increases (or decreases) the call quality.

With reference now to FIG. 1, the method 100 can provide various steps to provide the moderator with the parameters of adding/dropping a user from the call based on the QoS and QoE of the call.

In step 101, the IP address of the participant requesting to join the call including at least one other user is inferred.

In step 102, a codec is inferred to stream an emulated network pattern for the call to the participant requesting join the call (e.g., Iperf can be used here to emulate such network traffic). In other words, a dummy packet is created which would emulate the activity of the user on the call. The network pattern is emulated by the codec miming parameters that include inbound and outbound capacity, characteristics of platform bandwidth (availability, in use, not in use), QoS/QoE metrics derived from each of the multi-party calls that are in play (derived from per-call QoS/QoE model driven framework), PMI and health from the associate servers running the service of the additional user to the call.

In step 103, the call quality perceived by all of the other participants is measured while the emulated dummy packet is run on the call (e.g., using the RTCP packets) including the "simulated" new user. Thus, the dummy packets are emulated on the call to simulate how the call quality perceived by all of the other participants will change if the new user is added. For example, the parameters of the new users are added to the call to measure the perceived call quality after the new user is added (e.g., the call quality of all the other users after the addition). It is noted that the dummy packets are preferably used such that no packets are sent or received to not strain the call while measuring the quality (i.e., the call quality is not changed while measuring the perceived change in call quality). Also, the codec inferred in step 102 can be inferred in a multi-part manner by inferring a codec for input/output capability, output only capability, video capability, etc. In other words, the parameters of the dummy packet will change based on the requested access (i.e., services) of the new user (i.e., a video call request will stress the call more than a listen-only user request).

In step 104, an impact on call quality on all of the participants is estimated in case that the new user joins the call based on the perceived call quality of the other users and the network pattern of the new user joining the call. Metrics can also be pulled to estimate the likely number of participants that will enter based on calendaring and scheduling information and also based on organic statistical models (e.g., if a first user joins a conference on this topic, a second user and a group of users will likely want to join in two minutes especially if they have some relationship or association with the first user). That is, an actual call quality is measured based on the perceived call quality for each of the users and the parameters of the new user (i.e., if current call quality is "good", and perceived quality is decreased for each user, then the impact will cause the quality to he "poor" instead of "good").

In step 105, the impact is displayed to the moderator and the moderator can accept or decline whether to add the new user.

Figure 2:
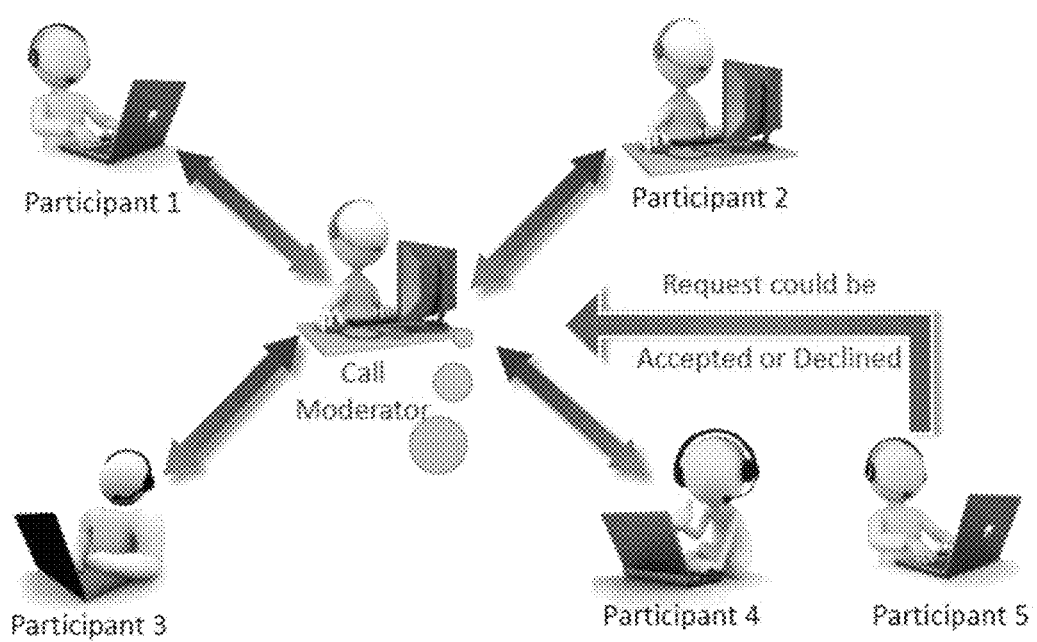
FIG. 2 exemplarily depicts an action by a call moderator.

With reference now to FIG. 2, the method 100 can create an IP address for a new user requesting to join a call (i.e., participant 5), infer a network pattern change of the call caused if the new user were to join the call by creating a dummy packet to simulate the new user (e.g., participant 5), estimate a perceived call quality change for all of the other users (i.e., participants 1-4) on the call if the new user (e.g., participant 5) were to join, and measure the impact on all of the participants based on the perceived call quality change and the network pattern of the new user without the new user (e.g., participant 5) actually joining the call. Then, the call moderator (call administrator) can accept or decline the addition of the new user to the call based on a Graphical User Interface (GUI) displaying the measured impact on the call quality. In this manner, the moderator can decide if they are willing to lower the call quality to add an additional new user to the call instead of letting a user join and then determining to remove a user if the call quality drops. Also, the dummy packets allow the new user to be simulated in the call without actually sending or receiving packets that would degrade the call quality of the current users in the call.

Further, since the type of access a new user is requesting changes based on the type of access (i.e., voice-only, voice and listen, video-input, video and voice liste, etc.), the dummy packet can be created and run for each possible type of access to the call to determine the impact on the call quality. Each impact is displayed to the moderator and the moderator can decide whether to add the new user but only with listening capability if the call quality would decrease more than an acceptable threshold to the moderator if the new user had, for example, video capability. Thus, the moderator can not only limit the quantity of users, but also each of their qualitative capabilities. That is, the moderator can limit the QoS for each new user if approaching a threshold of "poor" quality, thereby preserving the QoS for all of the current users on the call.

It is noted that the invention described herein references a single call on the system. However, the invention is not limited thereto. In some embodiments, the system can have several calls being managed each by several agents. Each call can be, for example, on a separate Virtual Machine (VM) but the resources used by all the VM's are shared (or each VM has multiple call sessions on it of which the resources are shared). The system can decide which agent can add additional callers thus adding a stress on the VM for the call based on, for example, a fee for the services prioritizing certain agents. In other words, if three calls are on the same VM, the system can decide which of the three calls can add a caller and how the addition of a caller affects the quality of the other two calls. Thus, consideration of all the calls on the VM run by the system can be considered when adding a user.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of distributed computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction., country, state, or datacenter).

Rapid elasticity: capabilities can be rapidly and elastically provisioned, in sonic cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (Paas): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls), Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 3, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel. Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/sewer 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
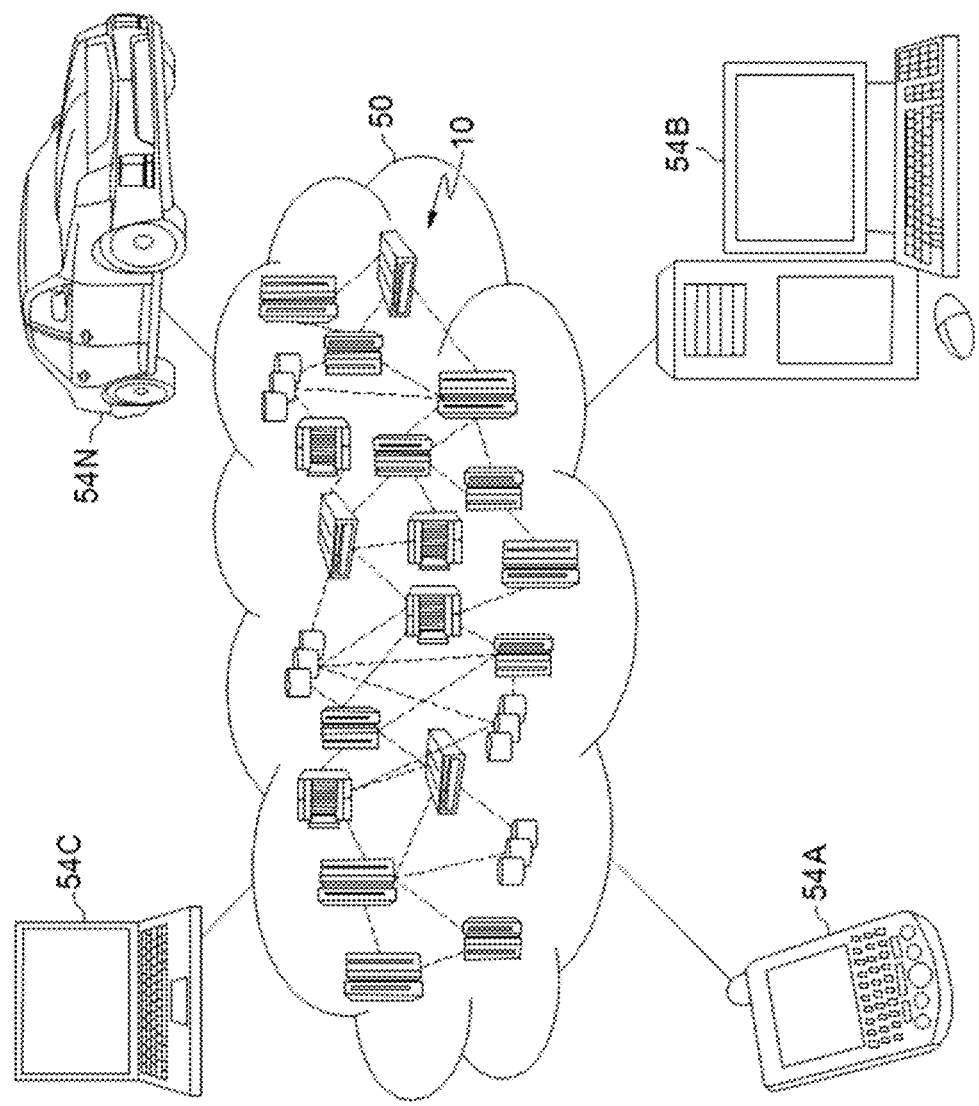
FIG. 4 depicts a cloud-computing environment 50 according to an embodiment of the present invention.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
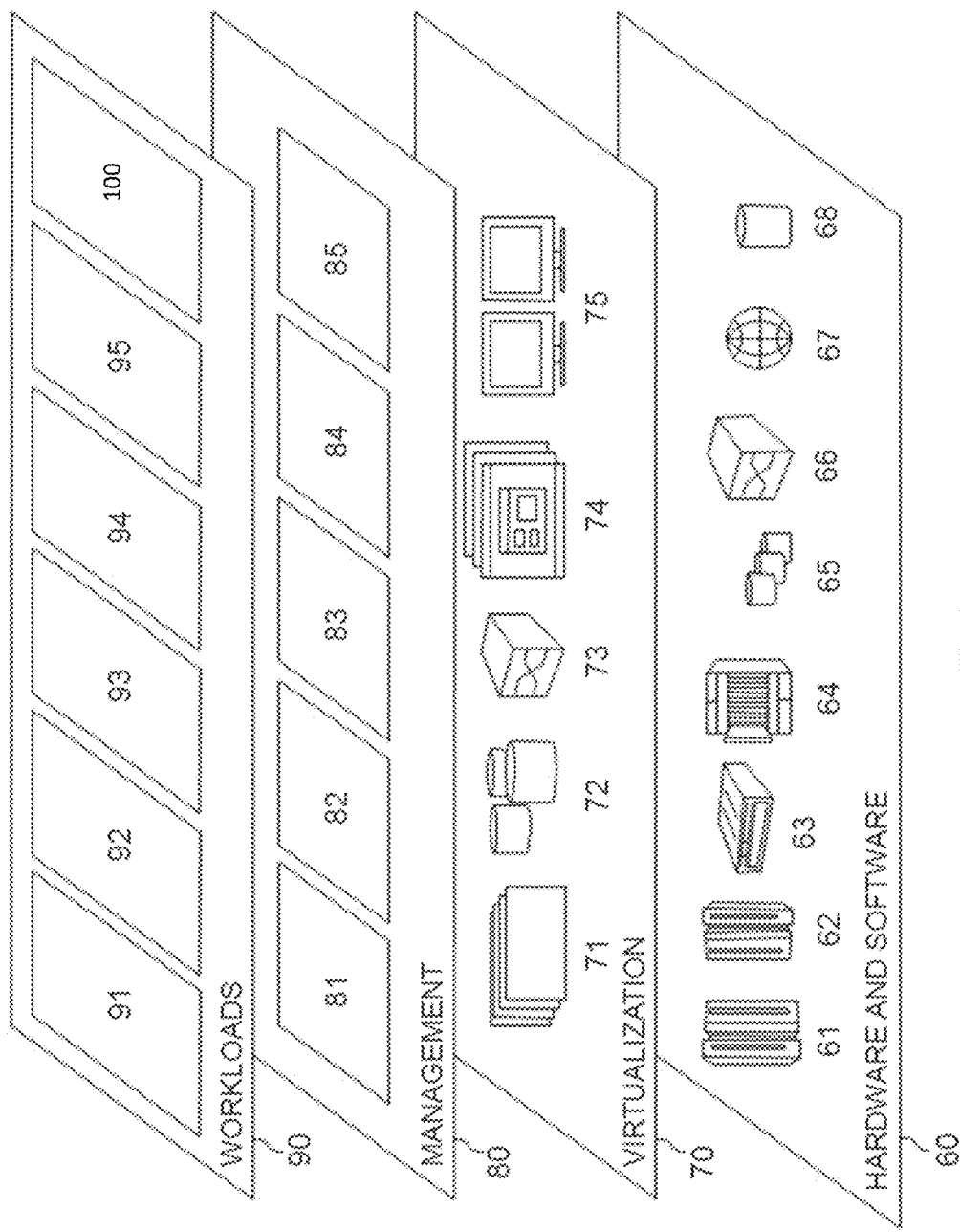
FIG. 5 depicts abstraction model layers according to an embodiment of the present invention.

Referring now to FIG. 5, an exemplary set of functional abstraction layers provided by cloud computing environment 50 (FIG. 4) is shown. It should be understood that in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and conference call management method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), a Storage Area Network (SAN), a Network Attached Storage (NAS) device, a Redundant Array of Independent Discs (RAID), an erasable programmable read-only memory (EPROM or Flash memory), a static random access memory (SRAM), a portable compact disc read-only memory (CD-ROM), a digital versatile disk (DVD), a memory stick, a USB "thumb" drive, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media. (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other progammable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration,-but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented conference call management method, the method comprising:
    inferring an Internet Protocol (IP) address of a new user requesting to join a call including at least one other user;
    inferring a codec to stream an emulated network pattern for the call in a case where the new user were to join the call, at a network level;
    measuring a call quality perceived by the at least one other user in the call, at a user end, while the emulated codec is run on the call;
    measuring an impact on the call quality in a case that the new user joins the call based on the perceived call quality and the emulated network pattern; and
    displaying the impact via a Graphical User Interface (GUI) for a moderator to decide whether to accept the new user to the call based on the measured impact on the call quality indicating that the call quality is sustained after accepting the new user to the call,
    wherein the codec includes a dummy packet streamed on the call such that the call quality does not chance while the codec is streamed on the call, and
    wherein the call quality is sustained after the new user joins the call when the perceived call quality and the emulated network pattern are unchanged.

2. The computer-implemented method of claim 1, wherein the codec comprises a plurality of codecs each for a different type of access for the new user to the call, and
    wherein the different type of access comprises at least one of:

voice chat access-only;
listening capability-only;
video chat capability;
voice chat and listening capability; and
video stream watching capability-only.

3. The computer-implemented method of claim 2, wherein each of the different type of access results in a different emulated network pattern that causes a different change to the measured call quality in the measuring, and
wherein the moderator selectively grants access to the new user for one of the different type of access based on the measured impact.

4. The computer-implemented method of claim 1, wherein the inferring the codec infers a plurality of codecs each for a different new user requesting to join the call,
wherein the impact on the call quality is estimated in a case that the new user joins the call based on the perceived call quality and the emulated network pattern of the new user, and
wherein the estimating estimates the impact of each of the codecs on the call incrementally such that the moderator can accept or decline a number of the different users.

5. The computer-implemented method of claim 1, embodied in a cloud-computing environment.

6. The computer-implemented method of claim 1, wherein a type of access the new user is requesting changes based on the type of access such that the dummy packet is created and run for each possible type of access to the call to determine the impact on the call quality.

7. The computer-implemented method of claim 6, wherein the moderator changes the type of access for each of the users in the call based on the type of access the new user is requesting.

8. The computer-implemented method of claim 6, wherein the moderator changes the type of access for each of the users in the call to maintain the call quality after accepting the new user to the call.

9. A non-transitory computer program product for conference call management, the computer program product comprising a computer-readable storage medium having program instructions embodied therewith, the program instructions executable by a computer to cause the computer to perform:
inferring an Internet Protocol (IP) address of a new user requesting to join a call including at least one other user;
inferring a codec to stream an emulated network pattern for the call in a case where the new user were to join the call, at a network level;
measuring a call quality perceived by the at least one other user in the call, at a user end, while the emulated codec is run on the call;
measuring an impact on the call quality in a case that the new user joins the call based on the perceived call quality and the emulated network pattern; and
displaying the impact via a Graphical User Interface (GUI) for a moderator to decide whether to accept the new user to the call based on the measured impact on the call quality indicating that the call quality is sustained after accepting the new user to the call,
wherein the codec includes a dummy packet streamed on the call such that the call quality does not change while the codec is streamed on the call, and
wherein the call quality is sustained after the new user joins the call when the perceived call quality and the emulated network pattern are unchanged.

10. The non-transitory computer program product of claim 9, wherein the codec comprises a plurality of codecs each for a different type of access for the new user to the call, and
wherein the different type of access comprises at least one of:
voice chat access-only;
listening capability-only;
video chat capability;
voice chat and listening capability; and
video stream watching capability-only.

11. The non-transitory computer program product of claim 10, wherein each of the different type of access results in a different network pattern that causes a different change to the measured call quality in the measuring, and
wherein the moderator selectively grants access to the new user for one of the different type of access based on the measured impact.

12. The non-transitory computer program product of claim 9, wherein the inferring the codec infers a plurality of codecs each for a different new user requesting to join the call,
wherein the impact on the call quality is estimated in a case that the new user joins the call based on the perceived call quality and the emulated network pattern of the new user, and
wherein the estimating estimates the impact of each of the codecs on the call incrementally such that the moderator can accept or decline a number of the different users.

13. A conference call management system, said system comprising:
a processor; and
a memory, the memory storing instructions to cause the processor to perform
inferring an Internet Protocol (IP) address of a new user requesting to join a call including at least one other user;
inferring a codec to stream an emulated network pattern for the call in a case where the new user were to join the call, at a network level;
measuring a call quality perceived by the at least one other user in the call, at a user end, while the emulated codec is run on the call;
measuring an impact on the call quality in a case that the new user joins the call based on the perceived call quality and the emulated network pattern; and
displaying the impact via a Graphical User Interface (GUI) for a moderator to decide whether to accept the new user to the call based on the measured impact on the call quality indicating that the call quality s sustained after accepting the new user to the call,
wherein the codec includes a dummy packet streamed on the call such that the call quality does not chance while the codec is streamed on the call, and
wherein the call quality is sustained after the new user joins the call when the perceived call quality and the emulated network pattern are unchanged.

14. The system of claim 13, embodied in a cloud-computing environment.

15. The system of claim 13, wherein the call quality is sustained when the impact after the new user joins the call is less than a threshold value.

16. The system of claim 13, wherein the call quality is sustained when the perceived call quality and the emulated network pattern after the new user joins the call is less than a threshold value.

17. The system of claim 13, wherein the call quality is sustained when the perceived call quality and the emulated network pattern is unchanged after the new user joins the call.

18. The system of claim 13, wherein the call quality is sustained when the impact is unchanged after the new user joins the call.

\* \* \* \* \*